(12) United States Patent
Yoshida et al.

(10) Patent No.: US 6,369,149 B1
(45) Date of Patent: Apr. 9, 2002

(54) AQUEOUS TREATMENT PROCESS AND BATH FOR ALUMINIFEROUS SURFACES

(75) Inventors: Masayuki Yoshida; Akio Shimizu, both of Atsugi; Ken-ichiro Oshita, Hiratsuka, all of (JP)

(73) Assignee: Henkel Corporation, Gulph Mills, PA (US)

( * ) Notice: Subject to any disclaimer, the term of this patent is extended or adjusted under 35 U.S.C. 154(b) by 0 days.

(21) Appl. No.: 09/462,704

(22) PCT Filed: Jul. 8, 1998

(86) PCT No.: PCT/US98/13590
§ 371 Date: Jan. 11, 2000
§ 102(e) Date: Jan. 11, 2000

(87) PCT Pub. No.: WO99/02758
PCT Pub. Date: Jan. 21, 1999

(30) Foreign Application Priority Data
Jul. 11, 1997 (JP) .............................. 9-202525

(51) Int. Cl.$^7$ .............................. C08K 3/30; B05D 1/18
(52) U.S. Cl. .................. 524/417; 427/354; 427/388.4; 427/421; 427/435; 148/251; 148/253
(58) Field of Search .................. 148/251, 253; 427/354, 388.4, 421, 435; 524/417

(56) References Cited

U.S. PATENT DOCUMENTS

| | | | |
|---|---|---|---|
| 2,438,877 A | 3/1948 | Spruance, Jr. | 148/6.16 |
| 4,148,870 A | 4/1979 | Kelly | 148/6.15 R |
| 4,859,351 A | 8/1989 | Awad | 252/32.5 |
| 5,030,323 A | 7/1991 | Awad | 156/665 |
| 5,064,500 A | 11/1991 | Awad | 156/665 |

FOREIGN PATENT DOCUMENTS

| | | |
|---|---|---|
| JP | 52 131937 | 11/1977 |
| JP | 01 085292 | 3/1989 |
| JP | 05 239434 | 9/1993 |

*Primary Examiner*—Peter D. Mulcahy
(74) *Attorney, Agent, or Firm*—Wayne C. Jaeschke; Stephen D. Harper

(57) ABSTRACT

An aqueous surface treatment bath that has a pH from 2.5 to 4.5 and contains at least 0.1 g/L of orthophosphate ions, from 0.1 to 3 g/L of condensed phosphate ions, from 0.1 to 0.5 g/L of free hydrofluoric acid, and at least 0.1 g/L of water-soluble polymer molecules that, except for short end groups as generally known in the art, conform to general formula (I) below:

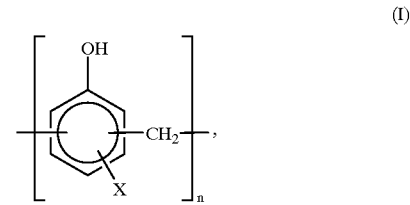

in which n is the degree of polymerization and has an integral value or each molecule, the average value of n for all of the molecules present being from 2 to 50 and not necessarily integral, X is a hydrogen atom or a moiety Y conforming to general formula (II)

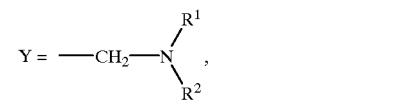

wherein each of $R^1$ and $R^2$ is an alkyl moiety or a hydroxy alkyl moiety having from 1 to 3 carbon atoms each, the total number of moieties Y having a ratio to the total number of aromatic rings that is from 0.2:1.0 to 1.0:1.0 forms a coating with an excellent corrosion resistance (particularly resistance to retort whitening), excellent slidability, and excellent paint adherence on surfaces of aluminiferous materials.

18 Claims, No Drawings

AQUEOUS TREATMENT PROCESS AND BATH FOR ALUMINIFEROUS SURFACES

FIELD OF THE INVENTION

This invention relates to a novel surface treatment liquid composition, usually for brevity called hereinafter a "bathe", even though it may be applied to surfaces by other methods than immersion, that imparts an excellent corrosion resistance and paint adherence to aluminiferous surfaces (i.e., a surface of pure aluminum or of any aluminum alloy that contains at least 50 atomic percent of aluminum) after the aluminiferous surface is contacted with the bath according to the invention, prior to the painting of the aluminiferous surface. The invention also relates to a process for treating the surface of aluminiferous materials using this novel surface treatment bath. The present invention can be applied with particularly good results to the surface treatment of drawn-and-ironed, alternatively called "draw-ironed" and hereinafter usually abbreviated as "D", aluminum cans. That is, the present invention relates most specifically and most preferably to a novel aqueous surface treatment bath (1) that imparts an excellent corrosion resistance and paint adherence to the surfaces of aluminum DI cans prior to the painting or printing of the can surfaces and (2) that also supplies the excellent slidability required for the smooth conveyor transport of the cans (hereinafter abbreviated simply as slidability). The invention additionally relates to a process for treating the surface of aluminiferous materials using the described surface treatment bath.

BACKGROUND OF THE INVENTION

DI cans are already known as a type of two piece can. A DI can is fabricated by a drawing process and an ensuing ironing process. Tin-plated steel and aluminum alloy are used as the metal stock for DI cans based on their excellent workabilities. Draw-ironed aluminum alloy cans are in wide use at the present time for beer and carbonated beverages.

In the case of a draw-ironed can, painting is generally carried out on the already fabricated can body, and a variety of surface treatments have been carried out on the can body prior to its painting in order to improve the corrosion resistance of the can body and its adherence to paint films. Phosphate-chromate conversion treatments (chromium systems, see U.S. Pat. No. 2,438,877) and zirconium system conversion treatments (nonchromium systems, see Japanese Patent Application Laid Open (Kokai or Unexamined) Number Sho 52-131937 (131,937/1977)) are widely used commercially as surface treatments for DI aluminum alloy cans. Conversion treatment is a process in which a coating is formed on a surface by chemical reactions that occur, without any need for imposition of electric current from an outside source, when the workpiece and a treatment bath are brought into contact. This process is also known as "chemical conversion coating" and "conversion coating". Phosphate-chromate conversion treatments employ conversion treatment baths that contain hexavalent chromium and are thus a burden on wastewater treatment and are undesirable from an environmental standpoint. The surface treatment coatings produced by zirconium system conversion treatments suffer from problems, vide infra, with regard to corrosion resistance (particularly resistance to retort whitening), adherence (particularly in the case of a neck-in with its high degree of working), and slidability.

Once a DI aluminum alloy can has been subjected to surface treatment, the outer wall is typically printed with any of various designs adapted to the fill that will be introduced later and the inner wall is painted with a paint that will improve the corrosion resistance. Thus, both the inner and outer walls are overcoated with paint or ink and only the outer surface of the bottom of the can is typically left unpainted. After these processes have been completed, the can body is filled with any of various contents, such as beer or juice, provided with a lid, and sealed. The filled can is then submitted to a sterilizing treatment.

The sterilization conditions vary as a function of the particular fill. The sterilization methodologies include sterilization by immersing the can in hot water at 65 to 90° C. and more severe, higher temperature sterilization methods in which the can is exposed to an atmosphere at 115 to 130° C. (generally a retort treatment). For example, retort treatment is carried out when the fill is caféau lait or tea. As stated above, the bottom of a DI aluminum alloy can is basically left unpainted. As a result, when the coating produced by the surface treatment exhibits a poor corrosion resistance, the aluminum will become oxidized (corroded) in this region during the sterilization processes under discussion and a discolored appearance will be produced. More specifically, a black discoloration is typically produced by immersion in hot water, while a white discoloration is typically produced by retort treatment. Aluminum oxide is white in its native form, but in the case of immersion in hot water the growing oxide takes up, for example, the hardness components in the water and takes on a black color. These phenomena are generally known as "whitening" and "blackening". At the level of practical applications, the surface treatment coatings produced by the heretofore known phosphate-chromate conversion treatments and zirconium system conversion treatments are prone to undergo whitening during retort treatment, and the bottom is often painted in commercial applications to counter this problem. Moreover, since retort treatments in some cases cause a loss of adherence by ink on the outer surface, a type of primer known as a size coat or sizing may be applied prior to printing when a retort treatment will be carried out. No surface treatment coating is known at the present time that exhibits a high corrosion resistance and that, in the absence of a size coat, can prevent a loss of ink adherence during retort treatment.

Another problem area in the can fabrication process is the frequent transport upsets that can occur during the conveyor transport of cans. These upsets occur when a can tips over sideways and are due to the poor slidability of the can surface caused by a high friction coefficient of the outer can surface. Can conveyability is a particularly critical issue for transport to the printer. This creates a requirement in the can fabrication process for a reduction in the coefficient of static friction of the cans without any associated impairment in the adherence of the paint or ink that will be applied to the cans. An example of methods for improving the slidability is the invention disclosed in Japanese Patent Application Laid Open (Kokai or Unexamined) Number Sho 64-85292 (85, 292/1989). This invention relates to a surface treatment agent for metal cans that contains water-soluble organic substance selected from phosphate esters, alcohols, monovalent and polyvalent fatty acids, fatty acid derivatives, and mixtures of the preceding. However, while the disclosed method does produce an increase in the slidability, it does not produce improvements in the corrosion resistance or paint adherence. Another method directed to improving the slidability is the invention disclosed in Japanese Patent Application Laid Open (Kokai or Unexamined) Number Hei 5-239434 (239,434/1993). This method, which uses phosphate ester, again produces an increase in the slidability, but again also does not produce improvements in the corrosion resistance or paint adherence.

As indicated above, once a can has been filled with its contents, for example, juice, the lid is rolled on and the can is sealed. The desire to economize on lid stock has resulted in the use of lid diameters that are smaller than the diameter of the can body. The constriction or reduction in the diameter of the can body is known as the "neck-in". At present, the diameter of the 350 milliliter (hereinafter usually abbreviated as "mL") can body primarily used for beer, etc., is denoted as "211" for (2+11/16) inches, while the lid diameter is (2+6/16) inches or "206". Thus, the lid end of the can body is necked in from 211 to 206. An additional constriction has been considered in recent years in order to obtain additional savings in lid stock, and it is desired to constrict the lid to (2+2/16) or "202". The necked-in region of the can body will as a consequence be subjected to even more severe working, and this has also created desire for the appearance of a surface treatment coating that can provide a satisfactory adherence even in the instance of such working.

At present, however, no surface treatment bath and surface treatment process exist that can produce a surface treatment coating that exhibits (a) a satisfactory adherence even after severe working, (b) a high corrosion resistance including a high corrosion resistance to high-temperature sterilization (retorting), (c) good adherence in the absence of a size coating, and (d) a slidability that permits a smooth can transport.

PROBLEM(S) TO BE SOLVED BY THE INVENTION

The object of the present invention is to solve the problems described above for the prior art. More specifically, the object of the present invention is to provide a surface treatment bath and surface treatment process that can form on aluminiferous stock a surface treatment coating that (a) exhibits a high corrosion resistance during high-temperature sterilization (retorting) and does not whiten the surface of the workpiece during high-temperature sterilization, (b) renders a size coating (primer coating) unnecessary, (c) has a slidability that provides an excellent can conveyability during the can fabrication process, and (d) has an excellent adherence even when subjected to neck-in working.

DESCRIPTION OF THE INVENTION, INCLUDING PREFERRED EMBODIMENTS

The above-described problems are solved by an aqueous surface treatment bath for aluminiferous materials that characteristically has a pH from 2.5 to 4.5 and contains at least 0.1 gram of phosphate ions per liter of total treatment bath, this concentration unit of grams of any particular constituent per liter of total treatment bath being hereinafter usually abbreviated as "g/L", from 0.1 to 3 g/L of condensed phosphate ions, from 0.1 to 0.5 g/L of free hydrofluoric acid, and at least 0.1 g/L of water-soluble polymer molecules that, except for short end groups as generally known in the art, conform to general formula (I) below:

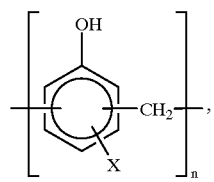

in which n is the degree of polymerization and has an integral value or each molecule, the average value of n for all of the molecules present being from 2 to 50 and not necessarily integral, X in each structural unit is independently selected from a hydrogen atom and a moiety "Y" that conforms to general formula (II) below:

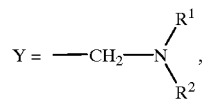

wherein each of $R^1$ and $R^2$ is selected, independently of each other and independently from one Y moiety to another, except as noted below, from the group of moieties consisting of alkyl moieties and hydroxy alkyl moieties having from 1 to 3 carbon atoms each, all with the proviso that the polymer molecules must contain moieties Y in a sufficient amount that the molar ratio of Y moieties to the total of aromatic rings is from 0.2:1.0 to 1.0:1.0.

Another embodiment of the invention is a process for treating the surface of aluminiferous materials that is characterized by the formation of a coating on the surface of an aluminiferous material by dipping said surface for at least 5 seconds in, or by intermittently spraying said surface for a total treatment time of at least 5 seconds with, an above-described surface treatment bath according to the invention that is maintained during its contact with the aluminiferous surface being treated at a temperature of at least 35° C., subsequently rinsing with water, and then drying by heating at least one temperature from 160 to 240° C., the coating formed containing carbon in an amount of from 3 to 40 milligrams of carbon per square meter of the coating formed, this unit of surface mass increase per unit area during the coating process being hereinafter usually abbreviated as "mg/m$^2$" and being applicable to other materials as well as to carbon, the coating formed also containing phosphorus in an amount from 0.5 to 10 mg/m$^2$.

Orthophosphoric acid (i.e., $H_3PO_4$), sodium phosphate (i.e., $Na_3PO_4$), and other sufficiently water-soluble salts can be used to furnish phosphate ions to a treatment bath according to the invention. The phosphate ions content must be at least 0.1 g/L and is preferably from 0.3 to 3 g/L and more preferably is from 0.4 to 2.2 g/L. At below 0.1 g/L the reactivity is poor and an acceptable coating will not usually be formed as a result. While good-quality coatings are formed at above 3 g/L, such concentrations are uneconomical due to the corresponding high cost of the treatment bath.

The condensed phosphate ions consist of at least one selection from the pyrophosphate ions, tripolyphosphate ions, tetrapolyphosphate ions, and the like conforming to the general chemical formula $P_xO_{(3x+1)}^{(x+2)-}$, where "x" represents a positive integer that is at least 2. The condensed phosphate ions can be supplied using either acid or salt. Thus, for example, both pyrophosphoric acid ($H_4P_2O_7$) and sodium pyrophosphate ($Na_4P_2O_7$) can be used to provide pyrophosphate ions. The condensed phosphate ions concentration must be from 0.1 to 3 g/L and is preferably from 0.3 to 1.5 g/L and more preferably is from 0.4 to 1.2 g/L. Concentrations below 0.1 g/L result in a weak etch and failure usually to form an acceptable coating. Concentrations in excess of 3 g/L result in an overly strong etch and inhibition of the coating-forming reactions.

For both orthophosphate and condensed phosphate ions, the stoichiometric equivalent of all acids, acid salts, and neutralized salts that would contain these entities if fully ionized is to be considered as part of the content for testing whether or not the concentration preferences set forth herein are satisfied by any particular composition, irrespective of the actual degree of ionization that may prevail in the specific composition.

The free hydrofluoric acid (i.e., HF) could simply be called hydrofluoric acid, but the "free" is added in order to exclude $F^-$ ions bonded by complex coordinate bonds to metal ions such as aluminum ions. Metal ions, such as aluminum ions, will be introduced when an aqueous surface treatment bath according to the present invention is used on a repetitive basis. The free hydrofluoric acid content must be from 0.1 to 0.5 g/L and is preferably from 0.1 to 0.3 g/L. Concentrations below 0.1 g/L result in a weak etch and failure to form an acceptable coating. Concentrations in excess of 0.5 g/L result in an overly strong etch and inhibition of the coating-forming reactions.

As already stated above, n denotes the average degree of polymerization of the water-soluble polymer molecules with formula (I) and must have a value from 2 to 50 and preferably has a value from 4 to 45. A value below 2 results in an excessively low molecular weight and hence in an inability to improve the corrosion resistance. Values in excess of 50 result in a decline in the stability of the aqueous bath and thus create the risk of problems appearing during actual applications.

Also as already stated above, X is hydrogen or a group Y with formula (II). Furthermore, Y moieties must be present in the polymer molecules, and the molar ratio of the Y moieties to the moles of aromatic rings in the polymer should be from 0.2:1.0 to 1.0:1.0. For example, the molar ratio is 0.9:1.0 when 9 Y groups are present in a polymer having n=10 (=10 aromatic rings). A ratio below 0.2:1.0 gives a sparingly water-soluble polymer, which will cause problems with treatment bath stability. At the other extreme, at a ratio in excess of 1.0 the water solubility becomes too high and an acceptable coating will not be formed. The molar ratio as defined above is preferably from 0.3 to 0.7.

The $R^1$ and $R^2$ moieties in Y are independently selected from $C_1$ to $C_3$ alkyl and $C_1$ to $C_3$ hydroxyalkyl moieties. The $R^1$ and $R^2$ moieties become too bulky, resulting in a coarse coating and hence in a diminished corrosion resistance, when they contain more than 3 carbon atoms.

The water-soluble polymer with formula (I) can be prepared by the usual methods. For example, this polymer can be prepared by the polycondensation of phenol and formaldehyde and then introduction of the functional group X using formaldehyde and amine. Formalin is typically used as the formaldehyde.

An aqueous surface treatment bath according to the present invention must contain at least 0.1 g/L of the water-soluble polymer, measured as polymer solids only, and preferably contains from 0.2 to 5 g/L and more preferably from 0.5 to 4 g/L, measured in the same way. A concentration below 0.1 g/L makes it extremely difficult to induce stable coating formation on the surface of the workpiece. At a concentration above 5 g/L, the high cost of the treatment bath can become an economic problem.

The pH of the treatment bath should be from 2.5 to 4.5 and is preferably from 2.8 to 4.5. A pH below 2.5 results in an overly strong etch and scanty coating formation. At a pH in excess of 4.5, the polymer has a pronounced tendency to precipitate, which results in a shortened bath life. The pH can be adjusted using an acid such as phosphoric acid, nitric acid, or hydrochloric acid, or a base such as sodium hydroxide, sodium carbonate, or ammonium hydroxide.

Problems can be produced by treatment bath foaming when a spray treatment is carried out. The appearance of foaming is strongly dependent on the equipment conditions, but, when changing the equipment conditions does not lead to sufficient improvement, a defoamer may be added to the treatment bath. Any defoamer that does not subsequently impair the paint adherence can be used.

The explanation will now turn to the surface treatment process for aluminiferous material using the aqueous surface treatment bath according to the present invention.

Aluminum stock and aluminum alloy stock are examples of aluminiferous materials to which the aqueous surface treatment bath according to the present invention may be applied. The aluminum alloy preferably contains at least 80 weight percent of aluminum and more preferably at least 90 weight percent of aluminum; examples of the alloying component are copper, silicon, magnesium, and manganese. Specific examples of the alloy are aluminum/manganese alloys of the Japanese Industrial Standard (hereinafter usually abbreviated as "JIS") A3000 system and aluminum/magnesium alloys of the JIS A5000 system. The shape of the aluminiferous material is not critical and can be exemplified by plate, sheet, coil, and can. However, in keeping with the preceding discussion in the sections on the prior art and problems to be addressed by the present invention, aluminum DI can is the most preferred aluminiferous material for application of the aqueous surface treatment bath according to the present invention.

The treatment bath according to the present invention can be applied, for example, according to the following process, which is provided as a preferred example.
(1) Surface cleaning: degreasing (can be carried out using acid, alkali, or solvent)
(2) Water rinse
(3) Coating-forming treatment (application of the treatment bath according to the present invention)
    treatment temperature: 35 to 65° C.
    treatment method: dipping or spraying
    treatment time: 5 to 30 seconds
(4) Water rinse
(5) Rinse with deionized water
(6) Heating and drying: 160 to 240° C.

A surface treatment bath according to the present invention should be used heated to at least 35° C. and preferably at 35 to 65° C. The reactivity is usually inadequate below 35° C., preventing the formation of good-quality coatings. While good-quality coatings are formed above 65° C., the high energy costs for heating associated with such temperatures are economically undesirable. The dipping treatment time should normally be at least 5 seconds and preferably from 5 to 30 seconds. The reaction is usually inadequate in less than 5 seconds, preventing the formation of a coating with an excellent corrosion resistance. Treatment times in excess of 30 seconds provide no additional increase in performance.

When a spray treatment that employs a continuous spray of the bath is used, the pH at the interface with the surface usually undergoes too little increase to promote deposition of an adherent solid film, and, as a result, an acceptable coating often will not be formed. For this reason the bath should be sprayed intermittently, with a preferred interval of from 1 to 5 seconds between periods of spraying. The total time of spraying during treatment, when spraying is the means of establishing contact, normally should be at least 5 seconds and is preferably from 7 to 30 seconds. The reaction will usually be inadequate in less than 5 seconds, preventing the formation of a coating with an excellent corrosion resistance. On the other hand, treatment times in excess of 30 seconds provide no additional increase in performance.

After being contacted with the bath, a workpiece preferably is rinsed with water and then with deionized water, and then independently preferably is heated to at least one elevated temperature in a range from 160 to 240° C., for a sufficient time to dry the workpiece if it is not already dry when heating is begun. This heating and, optionally, drying is believed to cause an increase in the molecular weight of the water-soluble polymer (oligomer) adhering on the surface, and, whatever the actual chemical reason, results in the development of a more satisfactory corrosion resistance. This increase in corrosion resistance will not usually adequately develop at drying temperatures below 160° C., while temperatures in excess of 240° C. will in many cases cause a reduction in the strength of the metal substrate and therefore are undesirable. Furthermore, the increase in corrosion resistance requires a certain amount of time at the elevated temperature; this time independently preferably is at least, with increasing preference in the order given, 0.2, 0.4, 0.6, 0.8, 1.0, 1.2, 1.4, 1.6, 1.8, or 2.0 minutes and independently, primarily for reasons of economy, preferably is not more than, with increasing preference in the order given, 30, 20, 10, 5.0, 4.0, 3.0, or 2.5 minutes. Preferably, at least for reasons of overall process speed, heating and drying are accomplished simultaneously by beginning drying as soon as practically possible after the last rinsing operation, or at least while the surface that has been treated is still wet.

The added-on mass (hereinafter usually abbreviated as "add-on") of the coating formed per unit area of the surface of the aluminiferous material preferably includes from 3 to 40 "mg/m$^2$ of carbon and from 0.5 to 10 mg/m$^2$ of phosphorus. A satisfactory corrosion resistance is not usually obtained when the carbon add-on falls below 3 mg/m$^2$ or the phosphorus add-on falls below 0.5 mg/m$^2$. On the other hand, interference coloration, which compromises the appearance, will often appear on the treated surface when the carbon add-on exceeds 40 mg/m$^2$ or when the phosphorus add-on exceeds 10 mg/m$^2$. The preferred carbon add-on is from 5 to 35 mg/m$^2$ and the preferred phosphorus add-on is from 0.5 to 8 mg/m$^2$.

Aqueous surface treatment baths according to the present invention and processes for treating the surface of aluminiferous materials using this bath will be explained hereinbelow through a variety of working examples. The efficacy of these working examples will become clear through comparison with the comparative examples. The compositions of the aqueous surface treatment bath and the conditions of the surface treatment process are explained individually in each example and comparative example.

STANDARD TREATMENT PROCESS

Aluminum alloy cans (size=350 mL, can body diameter= 211) that had been fabricated by the drawing and ironing of aluminum alloy A3004 were subjected to the following sequence: cleaning in a sprayer with an 8% aqueous solution of a commercial cleaner (PALKLIN® 500 from Nihon Parkerizing Co. Ltd.) at 75° C. for 40 seconds, cleaning with a water rinse, spraying with the surface treatment bath reported in the particular example or comparative example, rinsing with tapwater, spraying with deionized water (specific resistance≧3,000,000 ohm·cm) for 10 seconds, and drying in a forced convection drying oven for 2 minutes.

METHODS FOR MEASURING THE ADD-ONS

The coating add-ons to the treated aluminum alloy surface were quantitatively measured. The carbon add-on was determined using a commercial surface carbon analyzer. The sample size was 32 square centimeters, and the measurement conditions were set at 500° C. for 5 minutes. The phosphorus add-on was determined using a commercial x-ray fluorescence analyzer. The sample size in this case was 3 centimeters in diameter.

QUALITY EVALUATION METHODS (1) Corrosion resistance

The corrosion resistance was evaluated through both the resistance to blackening and the resistance to retort whitening. To evaluate the resistance to blackening, the treated but unpainted can was dipped in boiling tapwater for 30 minutes, after which the change in appearance was evaluated. No blackening was scored as ++, partial blackening was scored as +, and blackening over the entire surface was scored as ×. To evaluate the resistance to retort whitening, the treated but unpainted can was retorted at 121° C. for 30 minutes, after which the change in appearance was evaluated. No whitening was scored as ++, partial whitening was scored as +, and whitening over the entire surface was scored as ×.

(2) Ink Adherence

The treated can, lacking a size coating, was printed with a commercial ink for outer can surfaces. The can was then retorted at 121° C. for 30 minutes, after which the ink adherence was evaluated by peeling with adhesive tape. No delamination was scored as ++, partial delamination was scored as +, and complete delamination was scored as ×.

(3) Paint Adherence

The treated can was painted with a commercial exterior surface white paint to give a thickness of 10 micrometres ( hereinafter usually abbreviated as "$\mu$m"). The can was then necked-in to 202 using a commercial necking machine, after which the adherence in the neck region was evaluated. No paint film delamination was scored as ++, partial delamination was scored as +, and complete delamination was scored as ×.

(4) Slidability

The slidability was evaluated by measuring the coefficient of static friction of the outer surface of the treated can using a commercial measurement instrument. The slidability improves as the value of the coefficient of static friction declines, and a coefficient of static friction ≦1.0 is generally regarded as excellent.

SPECIFIC COMPOSITIONS AND PROCESSES +de

The water-soluble polymer used in each of Examples 1 to 5 conformed to general formula (I), the specific meanings for each instance being specified below.

EXAMPLE 1

The aqueous surface treatment bath described below was used for the treatment.

The add-ons for the resulting coating are also reported below.

Aqueous Surface Treatment Bath 1:

| | |
|---|---|
| phosphate ions (added as 75% $H_3PO_4$ in water) | 0.5 g/L |
| pyrophosphate ions (added as $Na_4P_2O_7$) | 0.5 g/L |
| free hydrofluoric acid (HF) | 0.1 g/L |
| water-soluble polymer solids | 2.0 g/L |
| pH 4.5 (adjusted with sodium hydroxide) | |

Water-soluble Polymer 1
n=5
Y=—$CH_2N(CH_2CH_2OH)_2$
Y to aromatic ring ratio=0.3
   surface treatment temperature: 40° C.
   surface treatment time: total=20 seconds, interval=2 seconds
   heating and drying temperature: 180° C.
   carbon add-on: 20 mg/m$^2$
   phosphorus add-on: 4 mg/m$^2$

EXAMPLE 2

The aqueous surface treatment bath described below was used for the treatment.
The add-ons for the resulting coating are also reported below.
Aqueous Surface Treatment Bath 2

| | |
|---|---|
| phosphate ions (added as 75% $H_3PO_4$ in water) | 2.0 g/L |
| tripolyphosphate ions (added as $Na_5P_3O_{10}$) | 0.5 g/L |
| free hydrofluoric acid (HF) | 0.2 g/L |
| water-soluble polymer solids | 4.0 g/L |
| pH 2.8 (adjusted with sodium hydroxide) | |

Water-soluble Polymer 2
n=10
Y=—$CH_2N(CH_2CH_2OH)_2$
Y to aromatic ring ratio=0.7
   surface treatment temperature: 60° C.
   surface treatment time: total=30 seconds, interval=4 seconds
   heating and drying temperature: 220° C.
   carbon add-on: 10 mg/m$^2$
   phosphorus add-on: 3 mg/m$^2$

EXAMPLE 3

The aqueous surface treatment bath described below was used for the treatment.
The add-ons for the resulting coating are also reported below.
Aqueous Surface Treatment bath 3

| | |
|---|---|
| phosphate ions (added as 75% $H_3PO_4$ in water) | 1.0 g/L |
| pyrophosphate ions (added as $Na_4P_2O_7$) | 1.0 g/L |
| free hydrofluoric acid (HF) | 0.2 g/L |
| aluminum (Al) was added dissolved in hydrofluoric acid (HF) (Al 0.2 g/L, HF 0.44 g/L) | |
| water-soluble polymer solids | 0.5 g/L |
| pH 3.5 (adjusted with sodium hydroxide) | |

Water-soluble Polymer 3
n=10
Y=—$CH_2N(CH_3)_2$
Y to aromatic ring ratio=0.3
   surface treatment temperature: 60° C.
   surface treatment time: total=7 seconds, interval=1 second
   heating and drying temperature: 200° C.
   carbon add-on: 5 mg/m$^2$
   phosphorus add-on: 0.5mg/m$^2$

EXAMPLE 4

The aqueous surface treatment bath described below was used for the treatment.
The add-ons for the resulting coating are also reported below.
Aqueous Surface Treatment Bath 4

| | |
|---|---|
| phosphate ions (added as 75% $H_3PO_4$ in water) | 0.5 g/L |
| pyrophosphate ions (added as $H_4P_2O_7$) | 1.0 g/L |
| free hydrofluoric acid (HF) | 0.3 g/L |
| water-soluble polymer solids | 4.0 g/L |
| pH 3.0 (adjusted with sodium hydroxide) | |

Water-soluble Polymer 4
n=20
Y=—$CH_2N(CH_3)CH_2CH_2CH_2OH$
Y to aromatic ring ratio=0.5
   surface treatment temperature: 50° C.
   surface treatment time: total=30 seconds, interval=4 seconds
   heating and drying temperature: 200° C.
   carbon add-on: 35 mg/m$^2$
   phosphorus add-on: 8 mg/m$^2$

EXAMPLE 5

The aqueous surface treatment bath described below was used for the treatment.
The add-ons for the resulting coating are also reported below.
Aqueous Surface Treatment Bath 5

| | |
|---|---|
| phosphate ions (added as 75% $H_3PO_4$ in water) | 0.5 g/L |
| tripolyphosphate ions (added as $Na_5P_3O_{10}$) | 0.5 g/L |
| free hydrofluoric acid (HF) | 0.3 g/L |
| water-soluble polymer solids | 1.0 g/L |
| pH 3.0 (adjusted with sodium hydroxide) | |

Water-soluble Polymer 5
n=40
Y=—$CH_2N(CH_3)CH_2CH_2CH_2OH$
Y to aromatic ring ratio=0.5
   surface treatment temperature: 55° C.
   surface treatment time: total=20 seconds, interval=4 seconds
   heating and drying temperature: 160° C.
   carbon add-on: 15 mg/m$^2$
   phosphorus add-on: 3 mg/m$^2$

COMPARATIVE EXAMPLE 1

The aqueous surface treatment bath described below was used for the treatment.
The add-ons for the resulting coating are also reported below.

Aqueous Surface Treatment Bath 6

| | |
|---|---|
| phosphate ions (added as 75% H$_3$PO$_4$ in water) | 0.5 g/L |
| free hydrofluoric acid (as HF) | 0.3 g/L |
| water-soluble polymer solids | 1.0 g/L |
| Water-soluble polymer 1 as described above | |
| pH 6.0 (adjusted with sodium hydroxide) | | surface treatment temperature: 55° C.
surface treatment time: total=20 seconds, interval=4 seconds
heating and drying temperature: 180° C.
carbon add-on: 1 mg/m$^2$
phosphorus add-on: 0.1 mg/m$^2$

COMPARATIVE EXAMPLE 2

The aqueous surface treatment bath described below was used for the treatment.
The add-ons for the resulting coating are also reported below.
Aqueous Surface Treatment Bath 7

| | |
|---|---|
| phosphate ions (added as 75% H$_3$PO$_4$ in water) | 0.5 g/L |
| water-soluble polymer solids | 1.0 g/L |
| Water-soluble polymer 2 as described above | |
| pH 5.0 (adjusted with sodium hydroxide) | | surface treatment temperature: 60° C.
surface treatment time: total=30 seconds, interval=4 seconds
heating and drying temperature: 200° C.
carbon add-on: 1 mg/m$^2$
phosphorus add-on: 0.1 mg/m$^2$

COMPARATIVE EXAMPLE 3

Treatment was carried out in this instance using a 3% aqueous solution of a commercial phosphate-chromate surface treatment bath concentrate (ALODINE® 401 from Nihon Parkerizing Co., Ltd.). The add-ons for the resulting coating are reported below.
surface treatment temperature: 40° C.
surface treatment time: total=20 seconds, interval=3 seconds
heating and drying temperature: 200° C.
chromium add-on: 20 mg/m$^2$
phosphorus add-on 15 mg/m$^2$

COMPARATIVE EXAMPLE 4

Treatment was carried out in this case using a 2% aqueous solution of a commercial zirconium system surface treatment bath (ALODINE® 404 from Nihon Parkerizing Co., Ltd.). The add-ons for the resulting coating are reported below.
surface treatment temperature: 40° C.
surface treatment time: total=20 seconds, interval=3 seconds
heating and drying temperature: 200° C.
zirconium add-on: 14 mg/m$^2$

RESULTS

Table 1 reports the results from the performance evaluation tests carried out on the coatings produced in Examples 1 to 5 and Comparative Examples 1 to 4.

TABLE 1

RESULTS OF THE PERFORMANCE EVALUATION TESTS

| Identification | Corrosion Resistance to: | | Adherence to: | | Coefficient of Static Friction |
|---|---|---|---|---|---|
| | Blackening | Whitening | Ink | Paint | |
| Example 1 | ++ | ++ | ++ | ++ | 0.8 |
| Example 2 | ++ | ++ | ++ | ++ | 0.8 |
| Example 3 | ++ | ++ | ++ | ++ | 0.9 |
| Example 4 | ++ | ++ | ++ | ++ | 0.7 |
| Example 5 | ++ | ++ | ++ | ++ | 0.8 |
| Com Ex 1 | x | x | x | + | 1.5 |
| Com Ex 2 | x | x | x | + | 1.6 |
| Com Ex 3 | ++ | x | + | x | 1.6 |
| Com Ex 4 | ++ | x | + | x | 1.6 |

Abbreviation for Table 1
"Com Ex" means "Comparative Example".

Examples 1 to 5 employed aqueous surface treatment baths according to the present invention and surface treatment processes using this bath, and, as demonstrated by the results in Table 1, the coatings produced in Examples 1 to 5 gave excellent values for all the properties considered (corrosion resistance, adherence, and slidability). In contrast to this, the coatings produced in Comparative Examples 1 to 4 gave poorer values for almost all of the properties considered (corrosion resistance, adherence, and slidability), and each one of the Comparison Examples gave at least one value that was very much poorer than that achieved with the examples according to the invention. Good-quality coatings were not produced in Comparative Examples 1 and 2; Comparative Example 3 used a commercial phosphate-chromate agent; and Comparative Example 4 used a commercial zirconium system agent.

BENEFITS OF THE INVENTION

As has been made clear by the preceding description, a coating with an excellent corrosion resistance (particularly resistance to retort whitening), excellent paint adherence, and excellent slidability can be formed on the surface of aluminiferous materials through the use of the surface treatment bath for aluminiferous materials according to the present invention and the surface treatment process using said bath

What is claimed is:
1. An aqueous surface treatment composition for aluminiferous surfaces, said composition having a pH from 2.5 to 4.5 and comprising water and the following concentrations of the following components:

(A) at least 0.1 g/L of orthophosphate ions;
(B) from 0.1 to 3 g/L of condensed phosphate ions;
(C) from 0.1 to 0.5 g/L of free hydrofluoric acid; and
(D) at least 0.1 g/L of water-soluble polymer molecules that, except for end groups as generally known in the art, conform to general formula (I) below:

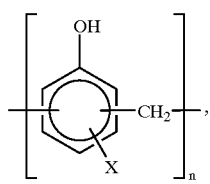

(I)

in which n is the degree of polymerization and has an integral value or each molecule, the average value of n for all of the molecules present being from 2 to 50 and not necessarily integral, X in each structural unit is independently selected from the hydrogen atom and a moiety Y conforming to general formula (II):

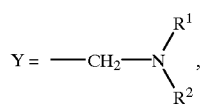

(II)

wherein each of $R^1$ and $R^2$ is selected, independently of each other and independently from one Y moiety to another, except as noted below, from the group of moieties consisting of alkyl moieties and hydroxy alkyl moieties having from 1 to 3 carbon atoms each, all with the proviso that the polymer molecules must contain moieties Y in a sufficient amount that the molar ratio of Y to the total of aromatic rings is from 0.2:1.0 to 1.0:1.0.

2. An aqueous surface treatment bath according to claim 1, in which the concentration of component (A) is from 0.3 to 3 g/L, the concentration of component (B) is from 0.3 to 3 g/L, the concentration of component (C) is from 0.1 to 0.3 g/L, and the concentration of component (D) is from 0.2 to 5 g/L.

3. An aqueous surface treatment bath according to claim 2, wherein the concentration of component (A) is from 0.4 to 2.2 g/L, the concentration of component (B) is from 0.4 to 2.2 g/L, the concentration of component (D) is from 0.5 to 4 g/L, and the pH is from 2.8 to 4.5.

4. An aqueous surface treatment bath according to claim 3, wherein the Y moiety to aromatic ring molar ratio in component (D) is from 0.3 to 0.7.

5. A process for treating an aluminiferous substrate surface to form thereon a coating that comprises from 3 to 40 mg/m² of carbon atoms and from 0.5 to 10 mg/m² of phosphorus atoms, said process comprising operations of:

(I) bringing said substrate surface into contact, by immersion or discontinuous spraying, for a total time of at least 5 seconds with an aqueous surface treatment composition according to claim 4, said composition during its contact with the substrate having a temperature of at least 35° C.;

(II) discontinuing contact between said substrate surface and any of said aqueous liquid treatment composition that does not remain adherent to the substrate after drainage under the force of natural gravity, to form a drained substrate;

(III) rinsing the drained substrate provided by completion of operation (II) as described immediately above with water, to form a rinsed drained substrate; and (IV) heating the rinsed drained substrate provided by completion of step (III) as described immediately above to at least one temperature in a range from 160 to 240° C. for a time of at least 0.2 minutes.

6. A process according to claim 5, wherein: the coating formed comprises from 5 to 35 mg/m² of carbon atoms and from 0.5 to 8 mg/m² of phosphorus atoms; in operation (I) the total time of contact is not more than 30 seconds; and in operation (IV) the heating time is from 0.6 to 5 minutes.

7. A process for treating an aluminiferous substrate surface to form thereon a coating that comprises from 3 to 40 mg/m² of carbon atoms and from 0.5 to 10 mg/m² of phosphorus atoms, said process comprising operations of:

(I) bringing said substrate surface Into contact, by immersion or discontinuous spraying, for a total time of at least 5 seconds with an aqueous surface treatment composition according to claim 3, said composition during its contact with the substrate having a temperature of at least 35° C.;

(II) discontinuing contact between said substrate surface and any of said aqueous liquid treatment composition that does not remain adherent to the substrate after drainage under the force of natural gravity, to form a drained substrate;

(III) rinsing the drained substrate provided by completion of operation (II) as described immediately above with water, to form a rinsed drained substrate; and (IV) heating the rinsed drained substrate provided by completion of step (III) as described immediately above to at least one temperature in a range from 160 to 240° C. for a time of at least 0.2 minutes.

8. A process according to claim 7, wherein: the coating formed comprises from 5 to 35 mg/m² of carbon atoms and from 0.5 to 8 mg/m² of phosphorus atoms; in operation (I) the total time of contact is not more than 30 seconds; and in operation (IV) the heating time is from 0.6 to 5 minutes.

9. A process according to claim 8, wherein the aluminiferous substrate surface includes at least part of an exterior surface of a drawn-and-ironed aluminum beverage container.

10. A process according to claim 7, wherein the aluminiferous substrate surface includes at least part of an exterior surface of a drawn-and-ironed aluminum beverage container.

11. An aqueous surface treatment bath according to claim 2, wherein the Y moiety to aromatic ring molar ratio in component (D) is from 0.3 to 0.7.

12. An aqueous surface treatment bath according to claim 1, wherein the Y moiety to aromatic ring molar ratio in component (D) is from 0.3 to 0.7.

13. A process for treating an aluminiferous substrate surface to form thereon a coating that comprises from 3 to 40 mg/m² of carbon atoms and from 0.5 to 10 mg/m² of phosphorus atoms, said process comprising operations of:

(I) bringing said substrate surface Into contact, by immersion or discontinuous spraying, for a total time of at least 5 seconds with an aqueous surface treatment composition according to claim 2, said composition during its contact with the substrate having a temperature of at least 35° C.;

(II) discontinuing contact between said substrate surface and any of said aqueous liquid treatment composition that does not remain adherent to the substrate after drainage under the force of natural gravity, to form a drained substrate;

(III) rinsing the drained substrate provided by completion of operation (II) as described immediately above with water, to form a rinsed drained substrate; and (IV) heating the rinsed drained substrate provided by completion of step (III) as described immediately above to at least one temperature in a range from 160 to 240° C. for a time of at least 0.2 minutes.

14. A process according to claim 13, wherein: the coating formed comprises from 5 to 35 mg/m$^2$ of carbon atoms and from 0.5 to 8 mg/m$^2$ of phosphorus atoms; in operation (I) the total time of contact is not more than 30 seconds; and in operation (IV) the heating time is from 0.6 to 5 minutes.

15. A process according to claim 14, wherein the aluminiferous substrate surface includes at least part of an exterior surface of a drawn-and-iron aluminum beverage container.

16. A process for treating an aluminiferous substrate surface to form thereon a coating that comprises from 3 to 40 mg/m$^2$ of carbon atoms and from 0.5 to 10 mg/m$^2$ of phosphorus atoms, said process comprising operations of:

(I) bringing said substrate surface into contact, by immersion or discontinuous spraying, for a total time of at least 5 seconds with an aqueous surface treatment composition according to claim 1, said composition during its contact with the substrate having a temperature of at least 35° C.;

(II) discontinuing contact between said substrate surface and any of said aqueous liquid treatment composition that does not remain adherent to the substrate after drainage under the force of natural gravity, to form a drained substrate;

(III) rinsing the drained substrate provided by completion of operation (II) as described immediately above with water, to form a rinsed drained substrate; and (IV) heating the rinsed drained substrate provided by completion of step (III) as described immediately above to at least one temperature in a range from 160 to 240° C. for a time of at least 0.2 minutes.

17. A process according to claim 16, wherein: the coating formed comprises from 5 to 35 mg/m$^2$ of carbon atoms and from 0.5 to 8 mg/m$^2$ of phosphorus atoms; in operation (I) the total time of contact is not more than 30 seconds; and in operation (IV) the heating time is from 0.6 to 5 minutes.

18. A process according to claim 17, wherein the aluminiferous substrate surface includes at least part of an exterior surface of a drawn-and-ironed aluminum beverage container.

* * * * *

UNITED STATES PATENT AND TRADEMARK OFFICE
CERTIFICATE OF CORRECTION

PATENT NO. : 6,369,149 B1
DATED : April 9, 2002
INVENTOR(S) : Yoshida et al.

It is certified that error appears in the above-identified patent and that said Letters Patent is hereby corrected as shown below:

<u>Title page,</u>
Item [57], ABSTRACT,
Line 4, delete "hydrofluonc", and insert therefor -- hydrofluoric --.

<u>Column 14,</u>
Lines 12 and 44, delete "Into", and insert therefor -- into --.

Signed and Sealed this

Third Day of February, 2004

JON W. DUDAS
*Acting Director of the United States Patent and Trademark Office*